United States Patent [19]

Tessler

[11] 4,167,621

[45] Sep. 11, 1979

[54] METHOD FOR PREPARING STARCH ETHER DERIVATIVES

[75] Inventor: Martin M. Tessler, Edison, N.J.

[73] Assignee: National Starch and Chemical Corporation, Bridgewater, N.J.

[21] Appl. No.: 918,709

[22] Filed: Jun. 26, 1978

[51] Int. Cl.$^2$ .................. C08B 31/16; C08B 33/06
[52] U.S. Cl. ................................ 536/108; 162/175; 536/49
[58] Field of Search ............................ 536/108, 49

[56] References Cited

U.S. PATENT DOCUMENTS

| | | | |
|---|---|---|---|
| 3,271,387 | 9/1966 | Patel et al. | 536/108 |
| 3,770,472 | 11/1973 | Jarowenko | 106/213 |
| 4,029,544 | 6/1977 | Jarowenko et al. | 162/175 |
| 4,119,487 | 10/1978 | Tessler | 162/175 |

Primary Examiner—Melvyn I. Marquis
Attorney, Agent, or Firm—Edwin Szala; Janet E. Hasak

[57] ABSTRACT

Starch ether derivatives are prepared by reacting a starch base with about 0.5–100% by weight of a neutralized alkyl ester of 3-chloro-2-sulfopropionic acid, based on dry starch, and then isolating the resultant starch derivative. The 2-sulfo-2-carboxyethyl starch ethers thus prepared may be utilized in many applications, and are particularly useful as wet-end additives in paper manufacturing at low pH.

12 Claims, No Drawings

METHOD FOR PREPARING STARCH ETHER DERIVATIVES

BACKGROUND OF THE INVENTION

I. Field of the Invention

This invention relates to a novel method for the preparation of starch ether derivatives. This invention is also directed to a novel starch modifying agent and a method for its preparation.

II. Description of the Prior Art

It is well known in the art to add anionic substituent groups to starch to form anionic and amphoteric starch ester and ether devivatives. Typical of the anionic substituent groups found in starch derivatives of the prior art are carboxyalkyl groups, sulfoalkyl groups, phosphate groups, and the like. A discussion of various starch ether derivatives containing these and other anionic groups can be found in "Starch: Chemistry and Technology," Vol. 11, ed. by R. L. Whistler and E. F. Paschall (New York: Academic Press, 1967), pages 312-326. Among the reagents used to prepare carboxyalkyl starch ether derivatives are included sodium chloroacetate and salts of 1-halocarboxylic acids such as sodium 1-chloropropionate (see U.S. Pat. No. 2,523,709), sodium 1-bromopropionate, and sodium 1-bromoisovalerate (see German Patent No. 727,275). Typical reagents used to prepare sulfoalkyl starch ether derivatives are sodium haloalkyl sulfonates such as, for example, sodium 2-haloethyl sulfonates (see U.S. Pat. Nos. 2,883,375 and 2,802,000), and sodium 3-chloro-2-hydroxypropyl sulfonate (see U.S. Pat. Nos. 2,825,727 and 2,806,857).

Sulfocarboxyalkyl starch ester derivatives are also known from the prior art; e.g., U.S. Pat. No. 4,029,544 to Jarowenko et. al. teaches a pigment retention aid comprising an amphoteric starch ester derivative containing sulfosuccinate groups and cationogenic or cationic nitrogen-containing groups.

Novel starch ether derivatives containing 2-sulfo-2-carboxyalkyl ether substituents are disclosed in U.S. Pat. No. 4,199,487. In preparing these derivatives, a starch base is reacted with neutralized 3-chloro-2-sulfopropionic acid. The derivatives thus produced are useful as pigment retention aids in paper.

It is an object of the present invention to provide another economical method for preparing 2-sulfo-2-carboxyethyl starch ether derivatives.

It is a further object to provide a novel reagent for preparing starch ether derivatives and a method for the preparation thereof.

SUMMARY OF THE INVENTION

The above and related objects are achieved in a method for preparing a starch ether derivative which comprises the steps of reacting a starch base with other 0.5-100% by weight of neutralized alkyl 3-chloro-2-sulfopropionate, based on dry starch, wherein the alkyl group has 1-6 carbon atoms, and isolating the resultant starch derivative. Preferably, the alkyl group of the 3-chloro-2-sulfopropionate ester contains 1 or 2 carbon atoms and the alkyl 3-chloro-2-sulfopropionate is neutralized with an alkali metal hydroxide or calcium hydroxide. The starch reaction may be carried out in aqueous, non-aqueous or substantially dry reaction medium.

In one embodiment of this method, the reaction is carried out in aqueous medium at pH of 9.5-13.0 and at a temperature of 20°-90° C. for 0.5-24 hours.

In another embodiment, the reaction is carried out in nonaqueous medium, and preferably in an organic solvent such as an alcohol or an aromatic or aliphatic hydrocarbon, at a temperature of 40-150° C. for 1-20 hours. The reaction can also be carried out in aqueous alcohols if desired.

In a third embodiment, the reaction is carried out in a substantially dry reaction medium at a temperature of 30°-150° C. for 0.5-10 hours.

The starch ether derivatives of this invention may be anionic or amphoteric in character, and when amphoteric, will contain cationogenic or cationic nitrogen-containing groups as well as the anionic substituent groups provided herein by the neutralized alkyl 3-chloro-2-sulfopropionate reagent.

The 3-chloro-2-sulfopropionate esters which, in neutralized form, react with starch to form the starch ethers herein, are themselves new reagents which are prepared by reacting chlorosulfonic acid with the appropriate ester of acrylic acid at a temperature of 70°-85° C. for 3-20 hours.

DESCRIPTION OF THE PREFERRED EMBODIMENTS

The applicable starch bases which may be used in preparing the starch ether derivatives herein may be derived from any plant source including corn, potato, sweet potato, wheat, rice, sago, tapioca, waxy maize, sorghum, high amylose corn, or the like. Also included are conversion products derived from any of the latter bases including, for example, dextrins prepared by the hydrolytic action of acid and/or heat; oxidized starches prepared by treatment with oxidants such as sodium hypochlorite; fluidity or thin-boiling starches prepared, for example, by enzyme conversion or mild acid hydrolysis; and derivatized starches such as ethers and esters. If the desired starch blend is to be a granular starch, then obviously the initial starting material must be in granular form. It is to be noted that the products of this invention may also be prepared employing gelatinized starches, i.e., non-granular starches.

The cationic starches (i.e., starches having cationogenic or cationic nitrogen-containing groups) which may be used to prepare the amphoteric starch ether derivatives of this invention are starch derivatives which are prepared, for example, by reacting starch through an etherification or esterification reaction with any reagent which will introduce a cationic group containing nitrogen, sulfur or phosphorus therein. Examples of such groups are the amine (primary, secondary, tertiary, or quaternary) sulfonium and phosphonium groups.

The alkyl 3-chloro-2-sulfopripionate reagent for the starch reaction herein is a novel reagent and may be conveniently prepared by the reaction of chlorosulfonic acid with the alkyl acrylate desired, analogous to reactions disclosed in U.S. Pat. No. 2,895,987 and *Bull. Soc. Chim. Fr.* (7-8), Part 2, 2266 (1973) for preparing 3-chloro-2-sulfopropionic acid. Specifically, the acrylate ester is first cooled and then the chlorosulfonic acid added while the temperature is maintained at between about 1° and 10° C. After addition is complete, the temperature of the reaction mixture is slowly raised to about 70°-85° C., depending on the acrylate ester employed. An exotherm generally occurs as the temperature is raised. The reaction mixture is agitated at about 70°–85° C. for about 3–20 hours. After reaction is complete, the vessel is cooled to room temperature and the product recovered.

Examples of suitable alkyl 3-chloro-2-sulfopropionates herein include methyl, ethyl, propyl, iso-propyl, butyl, iso-butyl, and hexyl 3-chloro-2-sulfopropionates. The ester functionality may be a linear or branched alkyl group. The preferred reagents for use herein are the methyl and ethyl esters because of their commercial availability. It is to be recognized that mixtures of the esters described above may also be employed herein as the reagent.

In the method herein described for preparing the starch ether derivatives, the alkyl 3-chloro-2-sulfopropionate reagent must be neutralized before reaction with starch. There are various modifications of the neutralization procedure neutralizing the sulfonic acid group of the reagent, depending upon the reaction medium used, the nature of the starch, the amount of reagent used, etc. In one modification, the reagent is neutralized prior to being mixed with starch by adding an aqueous solution of sodium hydroxide, or any other common alkali metal base including potassium hydroxide, lithium hydroxide, sodium and potassium carbonate, and the like, to the reagent in water. The resulting aqueous reagent solution may then be mixed directly with starch, or, alternatively, the neutralized reagent solution may be evaporated to dryness and used in the dry form. In another modification of the neutralization procedure, the alkyl 3-chloro-2-sulfopropionate reagent is neutralized in situ in a starch slurry using any common alkali or alkaline earth base. When granular starches are employed in the reaction, this latter method is particularly preferred, using lime (calcium hydroxide) as the neutralizing base. When non-granular starches are employed, either lime or aqueous sodium hydroxide (about 20–40% by weight) solution is preferred as the neutralizing base.

The exact structure of the neutralized alkyl 3-chlorosulfopropionate reagent which reacts with the starch base is not known with certainty and depends, for example, on the reaction medium employed. One proposal is that the alkyl 3-chloro-2-sulfopropionate hydrolyzes to the salt of 3-chloro-2-sulfopropionic acid, which reacts directly with the starch to form the ether derivative as represented by the equation below:

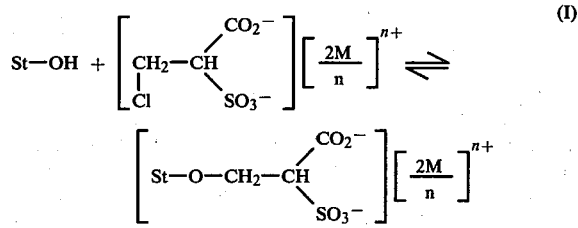

wherein St—O— represents a starch molecule, M is a cation, preferably an alkali or alkaline earth metal, and n is the valence number of M. However, nuclear magnetic resonance data indicate that neutralization of alkyl 3-chloro-2-sulfopropionate with aqueous sodium hydroxide solution results in the formation of substantial amounts of sodium α-sulfoacrylate. Thus, an α-sulfoacrylate salt may instead be the actual reagent which reacts with starch according to the following equation:

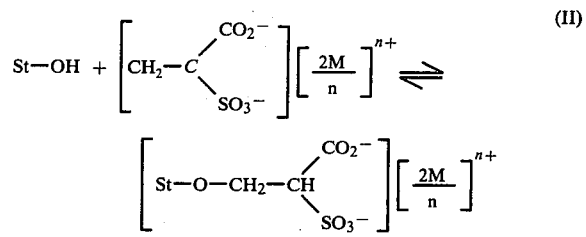

All of the alkyl 3-chloro-2-sulfopropionate reagent may not hydrolyze, however, such that the ester functionality remains intact. In this case, one or both of two reactions may occur to form a novel starch ether derivative depicted in the equations below:

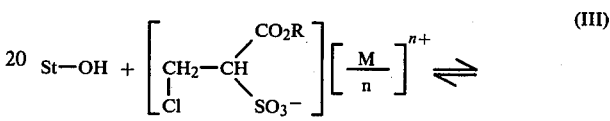

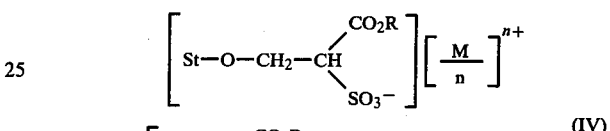

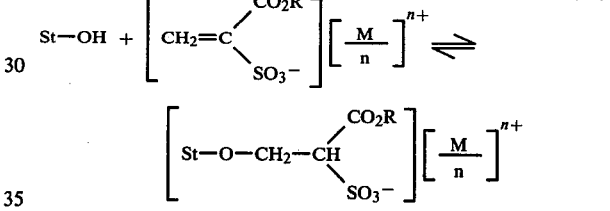

wherein R is an alkyl group having 1 to 6 atoms.

Because the structure of the neutralized alkyl 3-chloro-2-sulfopropionate is not known with certainty, the present invention is not intended to be limited to any specific reaction mechanism or structure for the reaction product.

The practitioner will recognize that the starch molecule is a polymer which contains many anhydroglucose units, each having three free hydroxyl groups (except the non-reducing end glucose units which contain four free hydroxyl groups) which may react with the neutralized alkyl 3-chloro-2-sulfopropionate reagent. Thus, the number of such displacements or the degree of substitution (D.S.) will vary with the particular starch, the ratio of reagent to starch and, to some extent, the reaction conditions. Furthermore, since it is known that the relative reactivity of each of the hydroxyl groups within the anhydroglucose unit is not equivalent, it is probable that some will be more reactive with the reagent than others.

The amount of neutralized alkyl 3-chloro-2-sulfopropionate reagent to be employed in the reaction with starch herein will vary from about 0.5–100% by weight, based on the weight of dry starch, depending on such factors as the starch based used and the degree of substitution required in the end product. In general, the preferred amount of reagent to be used is 2–15% by weight.

In the method of this invention the reaction may be carried out in aqueous, non-aqueous or substantially dry reaction medium. In aqueous medium, the temperature at which the reaction is carried out will vary from 20° to 90° C. for non-granular starches and from 20° to 55° C. for granular starches. It will be recognized by he practitioner that use of temperatures above about 60° C. with granular starches in aqueous medium will result in granule swelling and filtration difficulties or gelatinization of the starch. It is preferred to employ reaction temperatures in aqeuous medium of 20°-30° C.

The pH of the reaction mixture in aqueous medium may range from 9.5-13.0, with the preferred pH range being 11-12.5. The pH is conveniently controlled by the periodic addition of dilute aqueous sodium hydroxide or other common bases including potassium hydroxide, sodium or potassium carbonate, calcium hydroxide, and the like. Alternatively, the pH is not controlled, but rather an excess of the base is added initially to maintain the required alkaline pH.

When conducting the reaction in aqueous medium using alkali metal bases to neutralize the reagent, it is preferred, particularly when granular starches are employed, to carry out the reaction in the presence of sodium sulfate in amounts of from about 15-50% by weight of dry starch. The presence of sodium sulfate acts to suppress swelling of the starch and gives a more filterable product.

Upon contact of the neutralized reagent with starch, the reaction mixture is agitated under the desired reaction conditions. Reaction time in aqueous medium will vary from about 0.5 to 24 hours, depending on such factors as the amount of reagent employed, the temperature, the pH, the scale of the reaction, etc. In general, the preferred range of reaction times in aqueous medium is 1-6 hours. After completion of the reaction, the pH of the reaction mixture is preferably adjusted to a value of from 3.0 to 7.0 with any common acid such as hydrochloric acid, sulfuric acid, acetic acid, and the like, which acid may be conveniently added as a dilute aqueous solution.

Recovery of the resulting starch product may be readily accomplished, with the particular method employed being dependent on the form of the starch base. Thus, a granular starch is recovered by filtration, washed with water to remove any residual salts, and dried. The washed granular starch products may be drum-dried, or spray-dried, or gelatinized and isolated by alcohol precipitation or freeze drying. If the starch product is non-granular, it can be purified by dialysis to remove residual salts and isolated by alcohol precipitation, freeze drying, or spray drying.

While an aqueous medium is preferred, it is also possible to carry out the reaction in a non-aqueous medium. In this procedure, neutralized reagent which has been dried as previously described is added to a slurry of the starch base in a common organic solvent such as, for example, an alcohol, or an aromatic or aliphatic hydrocarbon. Examples of suitable solvents herein are ethanol, heptane, iso-propanol, butanol, toluene, and the like. The reaction in non-aqueous medium is carried out at a temperature of about 40°-150° C. for 1-20 hours, followed by isolation of the starch product.

If desired, the preparation of the starch ether derivatives of this invention may also be effected in a substantially dry reaction medium. In one variation of this method, the alkyl 3-chloro-2-sulfopropionate is neutralized and dried, and then added in dry form to a slurry of the starch base in water. The pH of the resulting mixture is adjusted to between 9.5 and 12 using any of the common bases described hereinabove. The mixture is stirred and the thusly-treated starch recovered from the slurry by filtration. The resultant starch is thereafter heated (as by placing in an oven) at temperatures of about 30°-150° C., preferably 40°-80° C. The reaction period, i.e., heating time, will vary according to the reaction temperature and selected starch base employed. Generally, lower temperatures will require longer reaction times. Reaction periods of about 0.5 to 10 hours have been found to be sufficient in most instances. At the end of the reaction period the starch product is allowed to cool. If removal of any residual salts is desired, the starch is then suspended in water, the suspension pH adjusted to about 3-7 using a common acid, and the resultant starch ether derivative recovered from the suspension by filtration, washing and isolation.

In another variation of the substantially dry reaction, the alkyl 3-chloro-2-sulfopropionate reagent is neutralized in situ by alternately adding reagent and lime in small amounts to a slurry of the starch in water while the pH is maintained between 9.5 and 12. After addition is complete, the treated starch is recovered and dried and the reaction conducted as described hereinabove.

A third variation of the substantially dry reaction involves spraying a neutralized aqueous solution of alkyl 3-chloro-2-sulfopropionate reagent onto a substantially dry starch and heating the treated starch as described above.

In addition to preparing anionic starch ether derivatives, it is also within the scope of this invention to prepare amphoteric starch ether derivatives which contain, in addition to the anionic substituent groups described hereinabove, cationogenic or cationic nitrogen-containing groups comprising primary, secondary, tertiary and quaternary amines and sulfonium and phosphonium groups attached to the starch through either ether or ester linkages. For purposes of this invention, tertiary amino and quaternary ammonium ether groups are preferred. The general method for preparing starches containing tertiary amino groups, which method typically involves reacting starch under alkaline conditions with a dialkylaminoalkyl halide, is described in U.S. Pat. No. 2,813,093. Another method therefor is disclosed in U.S. Pat. No. 3,674,725. The primary and secondary amine starches may be prepared by reacting starch with aminoalkyl anhydrides, aminoalkyl epoxides or halides, or the corresponding compounds containing aryl in addition to alkyl groups.

It can be appreciated by the practitioner that a large number of variations may be effected in reacting the starch base with neutralized alkyl 3-chloro-2-sulfopropionate reagent in accordance with the reaction procedures described above without materially departing from the scope and spirit of the invention. Such variations will be evident to those skilled in the art and are to be included within the scope of this invention.

The starch ether derivatives of this invention may be used as wet end additives and in many other applications wherein such derivatives are commonly used such as in coatings, sizes, oven cleaners, textile printing, and the like. The starch derivatives herein are particularly useful as pigment retention aids in the manufacture of paper containing pigment and alum.

The following examples will more fully illustrate the embodiments of this invention. In the examples, all parts and percentages are given by weight and all temperatures in degrees Celsius unless otherwise noted.

The following general test procedure is used throughout the examples to determine the percentage of 2-sulfo-2-carboxyethyl ether substituents present in the final starch derivative:

A total of 5.000 g. of starch product is slurried in 10 ml. of distilled water and 25 ml. of a 0.1 N hydrochloric acid solution then added. The starch slurry is agitated for 30 minutes, filtered, and washed with distilled water until the starch is free of chloride ion as determined by the silver nitrate test. The starch is then quantitatively transferred to a large beaker and 100 ml. of distilled water added, followed by 200 ml. of hot distilled water. The resultant mixture is then heated with agitation in a boiling water bath for 10 minutes, after which it is removed from the bath and titrated while still hot with 0.1 N sodium hydroxide solution to a phenolphthalein pink endpoint. If the starch product filters very slowly while being washed with water to remove the chloride ion, one of two other methods of purification of the starch product is employed. In one method, mixtures of aqueous ethanol are used to remove the chloride ion from the starch. In the second method, the starch slurry is centrifuged and the water removed therefrom by decanting rather than by filtration. In calculating the percentage of 2-sulfo-2-carboxyethyl ether substituents, it is assumed that all of the ester groups hydrolyzed completely to carboxylic acid groups.

EXAMPLE I

This example illustrates the preparation of ethyl 3-chloro-2-sulfopropionate and its use in the preparation of the starch ether derivatives of this invention in aqueous medium.

I. Preparation of Ethyl 3-Chloro-2-sulfopropionate

A total of 40 parts ethyl acrylate was placed in a flask and cooled to about 5° C. Then 50 parts chlorosulfonic acid was added slowly to the flask with agitation while cooling to maintain the temperature at about 0° to 10° C. After addition was complete, the temperature was slowly raised over a period of 3.5 hours to 80° C. A slight exotherm was noted at about 50°-55° C. The reaction mixture was agitated at 80° C. for 17 hours. After reaction was complete, the product was cooled to room temperature and used without additional purification in subsequent starch reactions. The yield of product was 90 parts of a thin, light amber liquid.

II. Starch Reactions

Starch A

A total of 50 parts corn starch was rapidly added to a solution of 1.5 parts sodium hydroxide and 15 parts sodium sulfate in 64 parts water. Then 2.0 parts ethyl 3-chloro-2-sulfopropionate from above was added and the resulting mixture agitated at 40° C. for 6 hours. After 2 hours at 40° C., when the pH of the reaction mixture was found to be 10.9, a total of 10 parts of 3% aqueous sodium hydroxide was added to increase the pH to 11.4. After the six-hour reaction period, the pH was lowered to 5.0, and the starch product isolated by filtration, washed with water, and dried. The resultant starch ether derivative was found to contain 0.52% of 2-sulfo-2-carboxyethyl ether substituents.

Starch B

A starch ether derivative was prepared and purified in an identical manner as above except that 1.7 parts potassium hydroxide was used instead of 1.5 parts sodium hydroxide, potassium sulfate was used instead of sodium sulfate, and the pH was raised after 2 hours at 40° C. by adding 7.5 parts of 8.8% potassium hydroxide solution. The resultant starch ether derivative was found to contain 0.38% of 2-sulfo-2-carboxyethyl ether substituents.

Starch C

A total of 2 parts ethyl 3-chloro-2-sulfopropionate from above was added to 12 parts water and the resulting solution neutralized to pH 11.0 with about 2.4 parts 50% aqueous sodium hydroxide solution while cooling with an ice bath. The neutralized solution was then added to a slurry of 50 parts corn starch in a solution of 1.5 parts sodium hydroxide and 15 parts sodium sulfate in 64 parts water. Then 15 parts of 3% aqueous sodium hydroxide was added to give a pH of 12.3, and the starch slurry was agitated at 50° C. for 17 hours. When the reaction was complete, the reaction mixture was cooled, the pH lowered and the starch isolated by filtration, washed with water, and dried. The resultant starch ether derivative was found to contain 0.43% of 2-sulfo-2-carboxyethyl ether substituents.

EXAMPLE II

This example illustrates the preparation of additional anionic starch ether derivatives of this invention employing calcium hydroxide under varied reaction conditions.

In preparing the starch ether derivatives designated Nos. 1–9 in Table I, the basic procedure which was followed comprised suspending 100 parts of the indicated starch in 125–150 parts water, adding 1 part calcium hydroxide (lime) to raise the pH of the starch slurry to about 11.5–12.0, and adding the indicated amount of ethyl 3-chloro-2-sulfopropionate reagent while adding more lime to maintain the pH at about 11.5. (In preparing Derivative Nos. 5–9 only, 2 parts excess lime was added). After addition of the reagent, the starch mixtures were agitated at room temperature for the indicated reaction time. When the reaction was completed, the pH was lowered to 3.0 with 10% aqueous hydrochloric acid, and the starch product then isolated by filtration, washed with water, and dried. The starch products were analyzed for 2-sulfo-2-carboxyethyl ether substituents and the results summarized in Table I.

EXAMPLE III

This example illustrates the preparation of the starch ether derivatives in aqueous medium using dry, neutralized reagent.

A total of 61.2 parts ethyl 3-chloro-2-sulfopropionate was added to 60.0 parts water and cooled with an ice bath. Then a total of 85.4 parts of 25% aqueous sodium hydroxide solution was slowly added to neutralize the reagent and to raise the pH to 11.0. The resulting neutralized reagent solution was evaporated to dryness at about 30°–35° C. under reduced pressure (water aspirator) using a rotary evaporator to yield 70.9 parts of a light gold solid product.

TABLE I

| Derivative No. | Starch Base | % Reagent, by weight, based on starch | % Total Calcium Hydroxide, by weight, based on starch | Reaction Time (hours) | % 2-Sulfo-2-carboxyethyl Ether Substituents |
| --- | --- | --- | --- | --- | --- |
| 1 | corn | 7.0 | 3.2 | 1 | 0.63 |
| 2 | corn | 7.0 | 3.4 | 2 | 0.64 |
| 3 | corn | 7.0 | 3.4 | 4 | 0.65 |
| 4 | corn | 7.0 | 3.4 | 6 | 0.70 |
| 5 | tapioca | 6.0 | 6.0 | 5 | 0.51 |
| 6 | High amylose corn (55% amylose by weight) | 6.0 | 6.0 | 5 | 0.51 |
| 7 | Waxy maize previously treated with 7.0% propylene oxide and 0.02% epichlorohydrin | 6.0 | 5.8 | 5 | 0.53 |
| 8 | Corn starch (oxidized by reaction with NaOCl to 60 fluidity) | 6.0 | 5.9 | 5 | 0.40 |
| 9 | corn | 10.0 | 7.0 | 6 | 0.85 |

A total of 0.25 parts lime was added to a slurry of 30 parts corn starch and 38 parts water to raise the pH to 11.8. Then 3.0 parts of the dry, neutralized reagent prepared above was added and the resulting mixture agitated at room temperature for 2.5 hours. An additional 0.1 part lime was then added and the mixture agitated at room temperature for another 2.5 hours. At the end of the reaction the pH was lowered from 11.2 to 3.0 with 9.5% aqueous hydrochloric acid solution and the starch product recovered by filtration, washed with water, and dried. The resultant anionic starch ether derivative was found to contain 0.44% 2-sulfo-2-carboxyethyl ether substituents.

EXAMPLE IV

This example illustrates the preparation of additional starch ether derivatives of this invention employing varied reaction pH wherein the pH of the reaction medium is controlled during the reaction.

The starch ether derivatives designated Nos. 10–14 in Table II were prepared as follows:

A total of 30 parts corn starch was suspended in 37.5 parts water and the pH raised to the indicated value by adding 3% aqueous sodium hydroxide solution thereto. Then 2.1 parts of the dry, neutralized reagent prepared as in Example III was added and the resulting mixture agitated at 30° C. for 17 hours while controlling the pH by periodic addition of 3% aqueous sodium hydroxide solution, as required. At the end of the reaction, the pH was lowered to 5.5, and the starch product recovered by filtration, washed with water, and dried. The resultant starch ether derivatives were analyzed for 2-sulfo-2-carboxyethyl ether substituents and the results summarized in Table II.

TABLE II

| Derivative No. | Controlled Reaction pH | % 2-Sulfo-2-carboxyethyl Ether Substituents |
| --- | --- | --- |
| 10 | 11.3 | 0.20 |
| 11 | 11.0 | 0.21 |
| 12 | 10.5 | 0.20 |
| 13 | 9.5 | 0.18 |
| 14 | 9.0 | 0.15 |

EXAMPLE V

This example illustrates the preparation of three starch ether derivatives in aqueous medium using a previously gelatinized starch base.

I. A total of 20 parts waxy maize starch which had been acid-converted to a degree known in the trade as 85 fluidity was added to 40 parts water and the resultant suspension cooked in a boiling water bath for 15 minutes. The resulting gelatinized starch dispersion was cooled to 85° C. and the pH raised to 11.6 with 10% aqueous sodium hydroxide solution. Then 5.0 parts of the dry, neutralized reagent of Example III was added to the starch suspension. The resulting starch mixture was agitated for 2 hours at 85° C. while controlling the pH at 11.6 by periodically adding 10% aqueous sodium hydroxide solution (a total of 43.9 parts was required). At the end of the reaction, the mixture was cooled to about 30° C. and the pH lowered to 6.0.

The starch product recovered thereby was purified by dialysis until a negative chloride test was obtain (about 24 hours) and then isolated by freeze drying. The resultant starch ether derivative was found to contain 1.0% 2-sulfo-2-carboxyethyl ether substituents.

II. A starch ether derivative was prepared and purified in the identical manner as above except that the amount of dry, neutralized reagent was increased to 20 parts, reaction temperture lowered to 35° C., and the reaction time increased to 18 hours. The rsultant starch product was found to contain 2.37% 2-sulfo-2-carboxyethyl ether substituents.

III. A starch ether derivative was prepared and purified in the identical manner as with Starch II above except that the reaction pH was raised and controlled with lime, and the pH was lowered to 3.0 before dialysis. The resultant starch product was found to contain 2.75% 2-sulfo-2-carboxyethyl ether substituents.

EXAMPLE VI

This example illustrates the method of this invention untilizing a non-aqueous solvent system.

I. A total of 25 parts corn starch, 2.5 parts sodium carbonate, and 2.5 parts dry neturalized ethyl 3-chloro-2-sulfopropionate reagent prepared as in Example III were added to 100 parts ethanol. The resulting mixture was refluxed with agitation for 20 hours, cooled, and filtered. The starch produce was purified by washing with water at pH 6.0 and then dried. The resulting starch ether derivative was found to contain 0.61% 2-sulfo-2-carboxyethyl ether substituents.

II. The above reaction was repeated in an identical manner except that the ethanol was replaced by toluene, the reaction time was increased to 24 hours, and the final product was purified by washing first with ethanol and then with water at pH 6.0. The resulting starch ether derivative was found to contain 0.21% 2-sulfo-2-carboxyethyl ether substituents.

III. The above reaction I was repeated in an identical manner except that ethanol was replaced by heptane, and the final product was washed first with ethanol and then with a 1:1 by volume mixture of ethanol:water. The resulting starch ether derivative was found to contain 0.48% 2-sulfo-2-carboxyethyl ether substituents.

EXAMPLE VII

This example illustrates the method of this invention untilizing a substantially dry reaction medium.

The starch ether derivatives designated as Nos. 15-17 in Table III were prepared as follows:

To a slurry comprising 50.0 parts corn starch in 62.5 parts water was added 10.0 parts dry neutralized ethyl 3-chloro-2-sulfopropionate reagent prepared as in Example III. The pH was raised to the desired value with 3% aqueous sodium hydroxide solution and the resulting starch isolated by filtration and then placed in an oven and heated at the given temperatures for the given reaction times. The starch product obtained thereby was cooled and then purified by resuspending in water, lowering the pH to 6.0, filtering, washing with water, and drying. The resultant starch ether derivatives were analyzed and the results summarized in Table III.

TABLE III

| Derivative No. | Reaction pH | Reaction Temperature (°C.) | Reaction Time (hours) | % Sulfo-2-carboxyethyl Ether Substituents |
|---|---|---|---|---|
| 15 | 10.5 | 150 | 2 | 0.21 |
| 16 | 11.0 | 70 | 2 | 0.28 |
| 17 | 11.4 | 40 | 5 | 0.24 |

EXAMPLE VIII

This example illustrates the preparation of butyl 3-chloro-2-sulforpropionate and its use in the prepartion of a starch ether derivative in accordance with this invention.

I. Preparation of Butyl 3-Chloro-2-sulfopropionate

A total of 64 parts butyl acrylate was placed in a flask and cooled to about 5° C. Then 62 parts chlorosulfonic acid was added slowly with agitation while cooling to maintain the temperature at about 0 to 10° C. After addition was complete, the temperature was slowly raised. At about 65° C., an exotherm occurred and the reaction temperature reached 110° C. while the outside bath temperature remained only at 68° C. The reaction mixture was then cooled to 80° C. and held at 80° C. for 16 hours. The cooled, final product was a viscous, dark-brown fluid, obtained in a yield of 111.4 parts.

II. Starch Reaction

A total of 50 parts corn starch was slurried in 62.5 parts water. Then 3.0 parts calcium hydroxide and 3.0 parts butyl 3-chloro-2-sulfopropionate, unpurified from above, were added, and the reaction mixture agitated at room temperature for 5 hours. After the reaction was complete, the pH was lowered to 3.0 with 9.3% hydrochloric acid, and the starch recovered by filtration, washed, and dried. The resultant starch ether derivative was found to contain 0.43% 2-sulfo-2-carboxyethyl ether substituents.

Summarizing, this invention is seen to provide a novel method for preparing starch ether derivatives. In addition, this invention provides a novel starch modifying reagent and a method for its preparation.

Now that the peferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. A method for preparing a starch ether derivative which comprises the steps of:
   a. reacting a starch base with about 0.5-100% by weight of neutralized alkyl 3-chloro-2-sulfopropionate, based on dry starch, wherein the alkyl group has 1-6 carbon atoms; and
   b. isolating the resultant starch.

2. The method claim 1 wherein said alkyl group contains 1 or 2 carbon atoms.

3. The method of claim 1 wherein said alkyl 3-chloro-2-sulfopropionate is neutralized prior to mixing with said starch.

4. The method of claim 1 wherein said alkyl 3-chloro-2-sulfopropionate is neutralized in situ in the presence of said starch.

5. The method of claim 3 or 4 wherein said neutralization is carried out using an alkali metal hydroxide or calcium hydroxide.

6. The method of claim 1 wherein said reaction is carried out in an aqueous medium at a pH of 9.5-13.0 and at a temperature of 20°-90° C. for 0.5-24 hours.

7. The method of claim 6 wherein said starch base is granular and contains cationic or cationogenic substituent groups and said reaction is carried out at a temperature of 20°-55° C.

8. The method of claims 6 or 7 wherein said reaction is carried out at a pH of 11-12.5 and at a temperature of 20°-30° C. for 1-6 hours.

9. The method of claim 6 wherein said reaction is carried out in the presence of 15-50% by weight of sodium sulfate, based on dry starch.

10. The method of claim 1 wherein said reaction is carried out in a non-aqueous medium at a temperature of 40°-150° C. for 1-20 hours.

11. The method of claim 10 wherein said reaction is carried out in an organic solvent selected from the group consisting of alcohols, aromatic hydrocarbons and aliphatic hydrocarbons.

12. The method of claim 1 wherein said reaction is carried out in a substantially dry reaction medium at a temperature of 30°-150° C. for 0.5-10 hours.

* * * * *